US012709330B2

(12) United States Patent
Okitsu et al.

(10) Patent No.: US 12,709,330 B2
(45) Date of Patent: Aug. 18, 2026

(54) METHOD OF JUDGING ZERO POINT ABNORMALITY OF STEERING ANGLE SENSOR AND JUDGING DEVICE

(71) Applicant: NISSAN MOTOR CO., LTD., Yokohama (JP)

(72) Inventors: Yuta Okitsu, Kanagawa (JP); Shouta Hamane, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 74 days.

(21) Appl. No.: 18/809,743

(22) Filed: Aug. 20, 2024

(65) Prior Publication Data

US 2025/0065952 A1 Feb. 27, 2025

(30) Foreign Application Priority Data

Aug. 24, 2023 (JP) ................................ 2023-135961

(51) Int. Cl.
*B62D 15/02* (2006.01)
*G01B 21/22* (2006.01)

(52) U.S. Cl.
CPC ....... *B62D 15/0245* (2013.01); *B62D 15/029* (2013.01); *G01B 21/22* (2013.01)

(58) Field of Classification Search
CPC ... B62D 15/0245; B62D 15/029; G01B 21/22
See application file for complete search history.

(56) References Cited

U.S. PATENT DOCUMENTS 4,842,087 A * 6/1989 Morishita ............ B62D 5/0478 180/404
5,065,324 A * 11/1991 Oshita .................... B62D 15/02 701/41
5,243,188 A * 9/1993 Hattori .................. G01D 5/366 701/41
7,085,638 B2 * 8/2006 Knoll ..................... G01D 5/366 701/41
9,205,869 B2 * 12/2015 Turner ................. B62D 15/021
9,758,191 B2 * 9/2017 Kim ..................... B62D 15/021
2003/0079932 A1 * 5/2003 Ono ....................... B62D 5/008 180/407
2004/0118629 A1 * 6/2004 Shirato ................. B62D 5/001 180/443
2005/0062848 A1 * 3/2005 Satou ....................... H04N 7/18 348/115
2005/0087381 A1 * 4/2005 Tobata .................. B60R 21/013 180/271
2007/0146169 A1 * 6/2007 Otsuka .............. G01D 5/24461 341/15

(Continued)

FOREIGN PATENT DOCUMENTS

JP 2002-340625 A 11/2002

*Primary Examiner* — Mussa A Shaawat
(74) *Attorney, Agent, or Firm* — Foley & Lardner LLP

(57) ABSTRACT

A method of judging an abnormality of a zero point of a steering angle sensor that outputs a steering angle according to a turning operation amount of a steering shaft with a straight-ahead state of a vehicle being the zero point, the method has, when the steering angle which is a threshold value or larger continues to be output until travelling with a vehicle speed of a predetermined speed or higher reaches a predetermined cumulative time, judging that the zero point has deviated.

5 Claims, 3 Drawing Sheets

(56) References Cited

U.S. PATENT DOCUMENTS

| | | | | |
|---|---|---|---|---|
| 2010/0241314 | A1* | 9/2010 | Bohm | B62D 7/1581<br>701/41 |
| 2011/0301815 | A1* | 12/2011 | Koukes | B62D 15/0245<br>701/42 |
| 2012/0041658 | A1* | 2/2012 | Turner | B62D 15/0245<br>701/1 |
| 2013/0311045 | A1* | 11/2013 | Tanimoto | B62D 5/0481<br>701/42 |
| 2015/0274206 | A1* | 10/2015 | Takeda | B62D 6/008<br>701/41 |
| 2016/0272239 | A1* | 9/2016 | Kim | B62D 15/021 |
| 2016/0347311 | A1* | 12/2016 | Kurata | B60W 30/12 |
| 2016/0362128 | A1* | 12/2016 | Sugawara | G01B 21/22 |
| 2018/0257704 | A1* | 9/2018 | Minaki | B62D 5/0463 |
| 2019/0263446 | A1* | 8/2019 | Tsubaki | B62D 6/00 |
| 2020/0156698 | A1* | 5/2020 | Tsubaki | B62D 5/0463 |
| 2021/0053620 | A1* | 2/2021 | Barthes | B62D 15/0245 |

* cited by examiner

IGNITION SWITCH
ON
OFF

VEHICLE SPEED
40km/h
0

CUMULATIVE TIME
300sec
0

STEERING ANGLE θ
+θth
0
−θth

ABNORMALITY
JUDGEMENT FLAG
1
t1
t2
TIME

METHOD OF JUDGING ZERO POINT ABNORMALITY OF STEERING ANGLE SENSOR AND JUDGING DEVICE

BACKGROUND OF THE INVENTION

The present invention relates to a technique of judging an abnormality (or a deviation) of a zero point of a steering angle sensor that outputs a steering angle according to a turning operation amount of a steering shaft with a straight-ahead state of a vehicle being the zero point.

In general, a steering shaft of a vehicle is provided with a steering angle sensor for detecting a steering angle. As exemplified in Japanese Unexamined Patent Application Publication No. 2002-340625 (hereinafter is referred to as "JP2002-340625"), the steering angle sensor outputs an output signal, as a steering angle, according to a turning operation amount of the steering shaft with a straight-ahead state of the vehicle being a zero point.

SUMMARY OF THE INVENTION

Calibration of the zero point of the steering angle sensor is performed by resetting an output of the steering angle sensor with a steering device of the vehicle being correctly aligned to a straight-ahead state, for instance, in a finished vehicle inspection process that is a final process on a vehicle production line. However, due to some cause such as human error, the zero point may have deviated or been shifted. In such a case, as one of the so-called self-diagnostic function, it is desirable to be able to immediately detect this zero point abnormality (this zero point deviation).

In this regard, JP2002-340625 is concerned with failure detection when an output signal of the steering angle sensor does not change, but cannot detect the zero point abnormality.

An object of the present invention is therefore to provide a method of judging the abnormality of the zero point of the steering angle sensor and a judging device of the abnormality of the zero point of the steering angle sensor.

According to one aspect of the present invention, a method of judging an abnormality of a zero point of a steering angle sensor that outputs a steering angle according to a turning operation amount of a steering shaft with a straight-ahead state of a vehicle being the zero point, comprises: when the steering angle which is a threshold value or larger continues to be output until travelling with a vehicle speed of a predetermined speed or higher reaches a predetermined cumulative time, judging that the zero point has deviated.

According to another aspect of the present invention, a judging device of a zero point abnormality of a steering angle sensor comprises: the steering angle sensor configured to output a steering angle according to a turning operation amount of a steering shaft with a straight-ahead state of a vehicle being a zero point; a vehicle speed detection unit configured to detect a vehicle speed; and a controller, wherein the controller is configured to, when the steering angle which is a threshold value or larger continues to be output until travelling with the vehicle speed of a predetermined speed or higher reaches a predetermined cumulative time, judge that the zero point has deviated.

If the zero point deviates or is shifted, when the vehicle travels straight ahead while keeping the steering device in the straight-ahead state, a steering angle according to a deviation amount is output. In the present invention, when the steering angle which is a threshold value or larger continues to be output until travelling with the vehicle speed of a predetermined speed or higher reaches a predetermined cumulative time, it is judged that the zero point has deviated.

According to the present invention, if there is a zero point deviation having a deviation amount corresponding to the threshold value, it is possible to detect its abnormality during travel of the vehicle. Then, by setting, as a condition of the zero point abnormality judgment, the condition that the steering angle which is a threshold value or larger continues to be output until travelling with the vehicle speed of a predetermined speed or higher reaches a predetermined cumulative time, an undesirable misjudgment can be suppressed.

The other objects and features of the present invention will become understood from the following description with reference to the accompanying drawings.

DETAILED DESCRIPTION OF THE INVENTION

An embodiment of the present invention will be described below with reference to the drawings.

Figure 1:
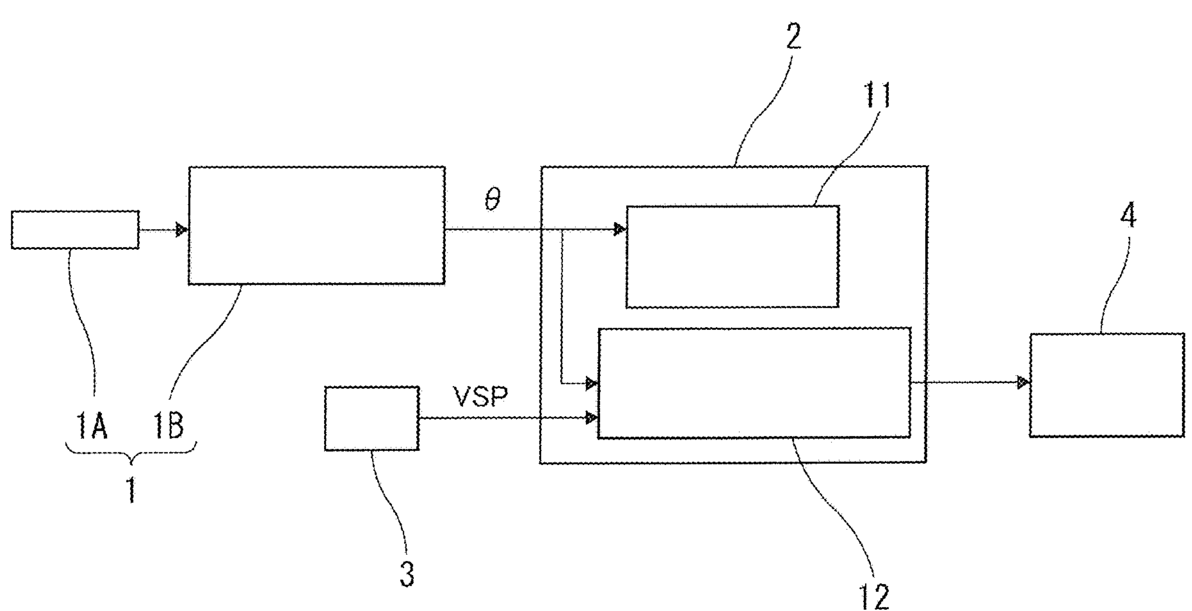
FIG. 1 is an explanatory drawing showing a system configuration of a zero point abnormality judging device according to an embodiment of the present invention.

FIG. 1 is an explanatory drawing showing a system configuration of a zero point abnormality judging device (a zero point deviation judging device) according to an embodiment of the present invention. The zero point abnormality judging device is configured as a part of function of a vehicle-mounted computer system. A steering angle sensor 1 is configured by a sensor body 1A that is provided at a steering shaft having a steering wheel and a sensor unit 1B that performs signal processing of a signal output from the sensor body 1A.

The sensor body 1A could be any type of sensor such as an optical sensor, a magneto-type sensor and an electromagnetic sensor. The sensor body 1A is configured to generate a pulse signal at every unit angle when the steering shaft is turned. The sensor unit 1B determines a turning operation amount of the steering shaft (the steering wheel) by counting the pulse signal output from the sensor body 1A, and outputs a signal of a steering angle θ with a zero point being a reference to a controller 2. As mentioned above, calibration of the zero point of the steering angle sensor 1 is performed by providing a reset signal to the sensor unit 1B with a steering device of a vehicle including the steering wheel being correctly aligned to a straight-ahead state, for instance, in a finished vehicle inspection process.

With regard to the controller 2, an output signal of a vehicle speed detection unit 3 that detects a vehicle speed VSP is input to the controller 2. Further, a warning lamp (or a warning light) 4 provided at a meter part in front of driver's seat is connected to the controller 2. As will be described later, when detecting an abnormality (or a deviation) of the zero point of the steering angle sensor 1, the controller 2 makes the warning lamp 4 light up, then the abnormality is notified.

The controller 2 has a variety of functions of controlling the vehicle, an engine and so on. The controller 2 has, as one of the functions, an idling stop control unit 11 for an idling stop function and a zero point diagnosis unit 12 that performs self-diagnosis of the zero point abnormality (the zero point deviation) of the steering angle sensor 1.

The idling stop control unit 11 automatically stops the engine of the vehicle (i.e. performs the so-called idling stop) when a predetermined idling stop condition (AND condition) is met, and automatically restarts the engine (i.e. performs automatic restart of the engine) when a predetermined restart condition (OR condition) is met after the idling stop. The idling stop condition is AND condition of some conditions (elements) such as "the vehicle speed VSP is almost 0", "a brake switch is ON", "a cooling water temperature is higher than an idling stop permission cooling water temperature", "a battery voltage is a predetermined level or higher" etc. The restart condition is OR condition of some conditions (elements) such as "the brake switch is OFF", "a start request from an air-conditioning device occurs", "the battery voltage decreases", "the cooling water temperature is the idling stop permission cooling water temperature or lower" etc. In the present embodiment, as one of the elements of the idling stop condition, "the steering angle θ is smaller (less) than a predetermined idling stop permission steering angle" is included. This condition is provided in consideration of change of a steering reaction force caused by an engine stop, i.e. a kickback acting on the steering wheel upon the engine stop. In a case where the steering angle θ is the idling stop permission steering angle or larger, even if the vehicle stops, the idling stop is forbidden.

Since the steering angle θ is one of the idling stop condition as described above, if the zero point of the steering angle sensor 1 is abnormal (the zero point of the steering angle sensor 1 has deviated or been shifted), for instance, in spite of the fact that the steering device of the vehicle is actually in the straight-ahead state, a calculated steering angle θ becomes the idling stop permission steering angle or larger, then the idling stop is forbidden. As a consequence, an intended fuel efficiency characteristic cannot be obtained.

In order to avoid such undesirable forbiddance of the idling stop, the zero point diagnosis unit 12 repeatedly judges whether the zero point is abnormal (the zero point has deviated or been shifted) after an ignition switch of the vehicle is turned on. More specifically, when the steering angle which is a threshold value or larger continues to be output until travelling with vehicle speed of a predetermined speed or higher reaches a predetermined cumulative time, the zero point diagnosis unit 12 judges that the zero point is abnormal (the zero point has deviated or been shifted). When taking specific values as an example, when the steering angle θ which is a threshold value θsh or larger continues to be detected until travelling with vehicle speed of 40 km/h or higher reaches cumulative 300 seconds, the zero point diagnosis unit 12 judges that the zero point is abnormal (the zero point has deviated or been shifted). The threshold value θsh is, for instance, 50° as an angle of the steering wheel. It is noted that since the steering angle θ with the straight-ahead being 0 (zero) can take both of a positive value and a negative value when one of right and left is a positive, strictly speaking, the threshold value θsh takes +50° and −50°. Therefore, in a case of the negative value, "threshold value θsh or larger" means that a magnitude of the value (an absolute value) is the threshold value θsh or larger.

The threshold value θsh is not limited to 50°, but can be set to an arbitrary value. However, if the threshold value θsh is too small, such misjudgment that a correct zero point is judged to be abnormal tends to occur. Conversely, if the threshold value θsh is too large, deviation or shift of the zero point which is smaller than this threshold value θsh is allowed or tolerated. As a favorable example, the threshold value θsh is set to a steering angle which is slightly larger than the idling stop permission steering angle. For instance, when the idling stop permission steering angle is 45° as an angle of the steering wheel, the threshold value θsh is set to 50° which is obtained by adding an appropriate margin (5°) to the idling stop permission steering angle 45°.

Figure 2:
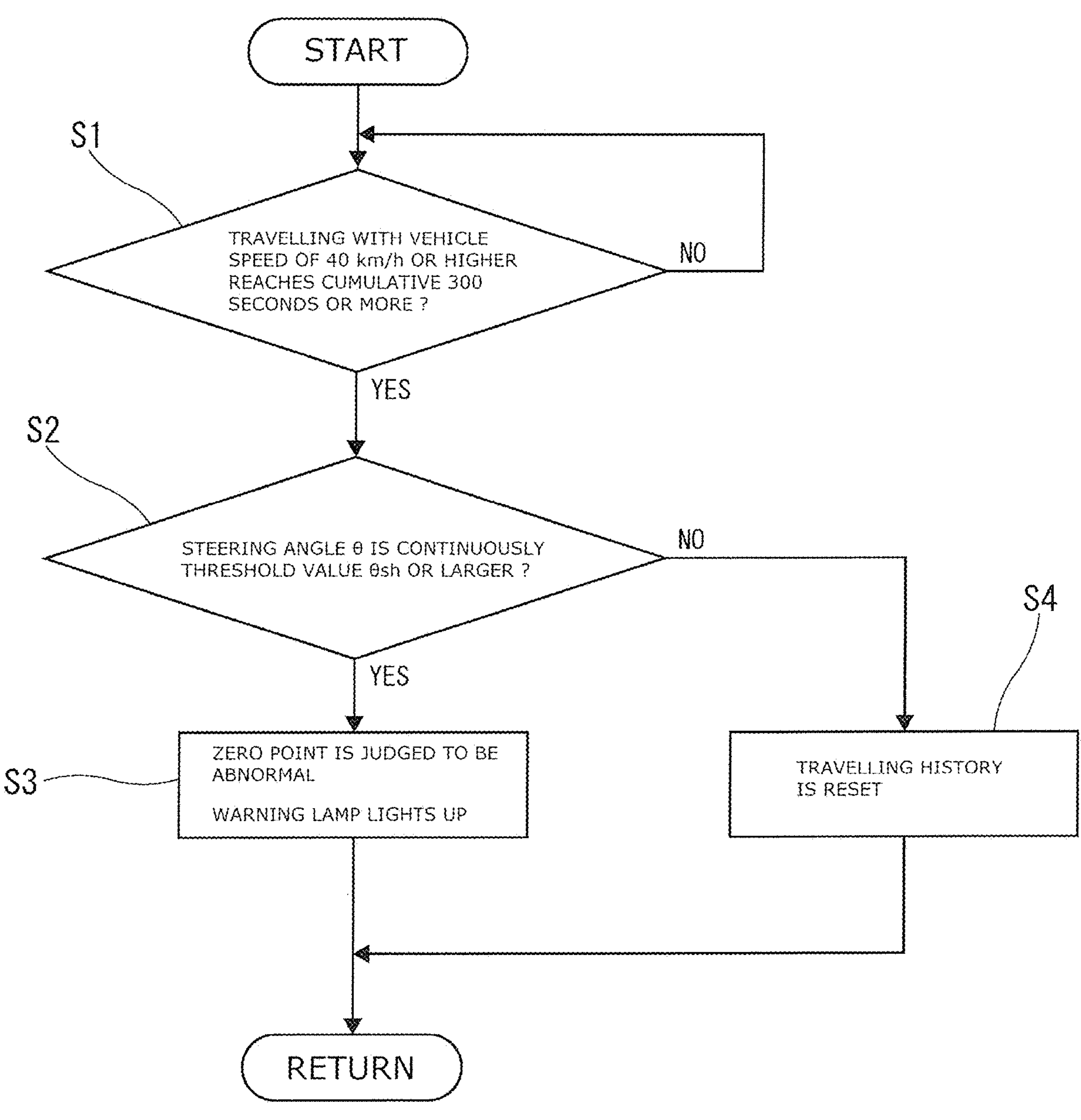
FIG. 2 is a flow chart showing a flow of operation executed by a controller.

FIG. 2 is a flow chart showing a flow of operation executed by the controller 2 as the zero point diagnosis unit 12. At step S1, a judgment is made as to whether or not travelling (travelling time) with vehicle speed of 40 km/h or higher reaches cumulative 300 seconds or more. If NO, the routine repeats the judgment of step S1 until the travelling (the travelling time) with vehicle speed of 40 km/h or higher reaches cumulative 300 seconds or more.

If the judgment of step S1 is YES, the routine proceeds to step S2 from step S1. At step S2, a judgment is made as to whether or not an output value of the steering angle θ is continuously the threshold value θsh or larger until the travelling (the travelling time) with vehicle speed of 40 km/h or higher reaches cumulative 300 seconds or more. If the judgment of step S2 is YES, the routine proceeds to step S3. At step S3, the zero point of the steering angle sensor 1 is judged to be abnormal (the controller 2 (the zero point diagnosis unit 12) judges that the zero point of the steering angle sensor 1 has deviated or been shifted), and the controller 2 makes the warning lamp 4 light up.

On the other hand, if the judgment of step S2 is NO, the routine proceeds to step S4. At step S4, a travelling history of step S1 is reset. Then, again, at step S1, the vehicle travels until the cumulative travelling time with vehicle speed of 40 km/h or higher reaches cumulative 300 seconds or more, and when the travelling time reaches 300 seconds or more, the judgment of step S2 is performed. That is, operation of steps S1 and S2 is repeatedly performed during the travel of the vehicle.

Figures 3A, 3B, 3C, 3D, 3E:
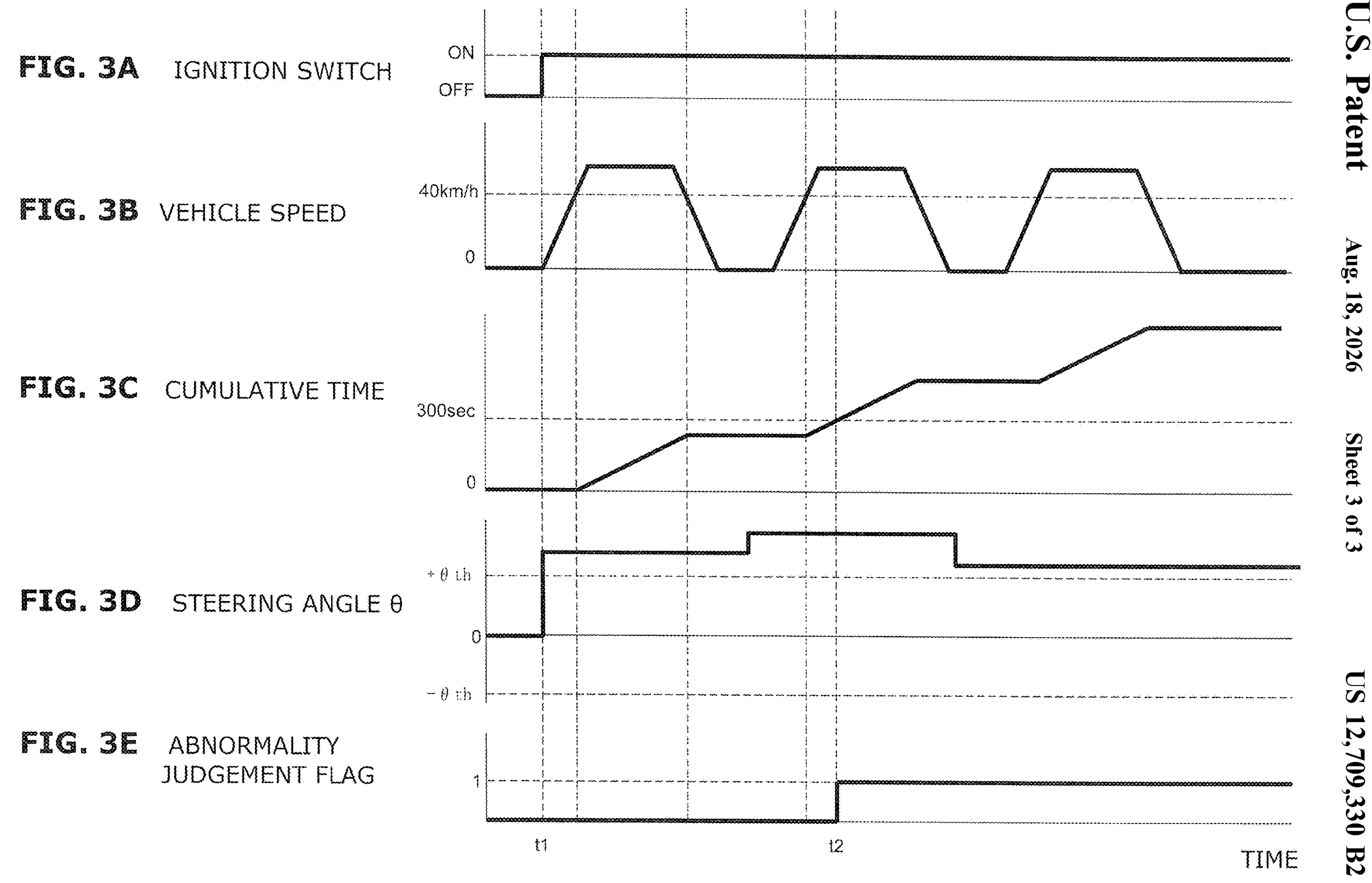
FIGS. 3A to 3E are time charts for explaining operation according the embodiment.

FIGS. 3A to 3E are time charts showing an example of the operation executed by the zero point abnormality judging device. FIG. 3A illustrates a state of the ignition switch. FIG. 3B illustrates the vehicle speed. FIG. 3C illustrates the cumulative travelling time with vehicle speed of 40 km/h or higher. FIG. 3D illustrates the steering angle θ (the output value of the steering angle sensor 1). FIG. 3E illustrates a zero point abnormality judgement flag.

In the example shown in FIGS. 3A to 3E, after the ignition switch is turned on at time t1, the vehicle starts to drive (travel), and as illustrated in FIG. 3B, travel and stop of the vehicle are repeated. As illustrated in FIG. 3C, when travelling time with vehicle speed of 40 km/h or higher is added up (totalized) then reaches 300 seconds (at time t2), a judgment is made as to whether or not the steering angle θ is continuously the threshold value θsh or larger for this period (i.e. between time t1 and time t2). In the example shown in FIGS. 3A to 3E, as illustrated in FIG. 3D, since the steering angle θ which is the threshold value θsh or larger continues to be output between time t1 and time t2, this is judged to be the zero point abnormality, and as illustrated in FIG. 3E, the zero point abnormality judgement flag becomes 1.

At time t2, if the steering angle θ is not continuously the threshold value θsh or larger between time t1 and time t2, the cumulative travelling time shown in FIG. 3C is reset. For instance, if the steering angle θ is (falls) below the threshold value θsh even temporarily between time t1 and time t2, this is not judged to be the zero point abnormality. Then, each time the cumulative travelling time reaches 300 seconds, the judgment of the steering angle θ is repeated.

Here, change of the steering angle θ illustrated in FIG. 3D indicates that a driver steers the vehicle (operates the steering wheel) from a state in which the zero point deviates or is shifted.

Regarding setting of numerical example such as "40 km/h or higher" and "300 seconds", it is very rare for the vehicle to continue travelling while keeping steering in the same direction at such vehicle speed. The numerical example of "40 km/h or higher" and "300 seconds" is set from this viewpoint. In other words, in a case where the zero point deviates or is shifted by the threshold value θsh or larger, for instance, when the vehicle travels on an almost straight road at vehicle speed of 40 km/h or higher for cumulative 300 seconds, this is judged to be abnormal. Such travelling situation can generally occur. On the other hand, in a case where the zero point is correct (normal), if the vehicle travels at vehicle speed of 40 km/h or higher for cumulative 300 seconds while keeping steering in the same direction, such misjudgment that this is judged to be abnormal might occur. However, in reality, such travelling situation almost never occurs.

In the present invention, the numerical example is not limited to "40 km/h or higher" and "300 seconds", but can be arbitrarily set to a proper value from the above viewpoint.

Although the embodiment of the present invention is described above, the present invention is not limited to the above embodiment, but includes various modifications. In the above embodiment, the abnormality of the zero point of the steering angle sensor is described with the abnormality of the zero point being linked to the idling stop function. However, the present invention can be widely applied as a technique of detecting the deviation or shift of the zero point of the steering angle sensor regardless of the presence or absence of the idling stop function.

The entire contents of Japanese Patent Applications No. 2023-135961 filed on Aug. 24, 2023 is incorporated herein by reference.

Although the invention has been described above by reference to certain embodiments of the invention, the invention is not limited to the embodiments described above. Modifications and variations of the embodiment described above will occur to those skilled in the art in light of the above teachings. The scope of the invention is defined with reference to the following claims.

EXPLANATION OF REFERENCE

1 . . . steering angle sensor
2 . . . controller
3 . . . vehicle speed detection unit
4 . . . warning lamp
11 . . . idling stop control unit
12 . . . zero point diagnosis unit

What is claimed is:

1. A method of judging an abnormality of a zero point of a steering angle sensor that outputs a steering angle according to a turning operation amount of a steering shaft with a straight-ahead state of a vehicle being the zero point, the method comprising:

detecting that traveling with a vehicle speed of a predetermined speed or higher reaches a predetermined cumulative time, making a judgement, by a controller, that an output value of the steering angle is continuously a threshold value or larger for the predetermined cumulative time, and judging, by the controller, that the zero point has deviated responsive to the judgement, and outputting, by the controller, a notification upon judging that the zero point has deviated.

2. The method of judging the abnormality of the zero point of the steering angle sensor as claimed in claim 1, wherein after an ignition switch of the vehicle is turned on, each time the travelling with the vehicle speed of the predetermined speed or higher reaches the predetermined cumulative time, repeatedly judging whether the steering angle which is the threshold value or larger continues to be output.

3. The method of judging the abnormality of the zero point of the steering angle sensor as claimed in claim 1, wherein the method is used for a vehicle having an idling stop function of stopping an engine when predetermined idling stop conditions are met, and an idling stop condition that the steering angle detected by the steering angle sensor is less than a predetermined value is one of the predetermined idling stop conditions.

4. The method of judging the abnormality of the zero point of the steering angle sensor as claimed in claim 3, wherein the threshold value is set to a respective steering angle which is larger than the predetermined value of the idling stop condition.

5. A judging device of a zero point abnormality of a steering angle sensor comprising:

the steering angle sensor configured to output a steering angle according to a turning operation amount of a steering shaft with a straight-ahead state of a vehicle being a zero point;

a vehicle speed detection unit configured to detect a vehicle speed; and a controller, wherein the controller is configured to, when the steering angle which is a threshold value or larger continues to be output until travelling with the vehicle speed of a predetermined speed or higher reaches a predetermined cumulative time, judge that the zero point has deviated.

* * * * *